United States Patent
Widegren et al.

(10) Patent No.: US 10,361,008 B2
(45) Date of Patent: Jul. 23, 2019

(54) METHOD OF MAKING A NUCLEAR FUEL PELLET FOR A NUCLEAR POWER REACTOR

(71) Applicant: WESTINGHOUSE ELECTRIC SWEDEN AB, Västerås (SE)

(72) Inventors: Hans Widegren, Västerås (SE); Edward J. Lahoda, Pittsburgh, PA (US); Lars Hallstadius, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 138 days.

(21) Appl. No.: 15/509,056

(22) PCT Filed: Apr. 24, 2015

(86) PCT No.: PCT/EP2015/058940
§ 371 (c)(1),
(2) Date: Mar. 6, 2017

(87) PCT Pub. No.: WO2016/037713
PCT Pub. Date: Mar. 17, 2016

(65) Prior Publication Data
US 2017/0287574 A1    Oct. 5, 2017

Related U.S. Application Data

(60) Provisional application No. 62/047,327, filed on Sep. 8, 2014.

(51) Int. Cl.
*G21C 21/02*    (2006.01)
*G21C 3/04*    (2006.01)
(Continued)

(52) U.S. Cl.
CPC .............. *G21C 21/02* (2013.01); *G21C 3/044* (2013.01); *G21C 3/18* (2013.01); *G21C 3/20* (2013.01);
(Continued)

(58) Field of Classification Search
CPC .......... G21C 3/18; G21C 21/02; G21C 3/044; G21C 3/20; G21C 3/623
(Continued)

(56) References Cited

U.S. PATENT DOCUMENTS 4,401,608 A    8/1983  Smith
2004/0047445 A1    3/2004  Delafoy et al.
(Continued)

FOREIGN PATENT DOCUMENTS

DE    3235944 A1    5/1983
GB    1146704 A    3/1969
(Continued)

OTHER PUBLICATIONS

Rondinella et al. "The high burn-up structure in nuclear fuel" Materials Today, Dec. 2010 (Dec. 1, 2010), pp. 24-32, vol. 13, No. 12.
(Continued)

*Primary Examiner* — Jack W Keith
*Assistant Examiner* — Daniel Wasil
(74) *Attorney, Agent, or Firm* — Murtha Cullina LLP

(57) ABSTRACT

A method of making a nuclear fuel pellet for a nuclear power reactor. The method includes: providing a nuclear fuel material in powder form, the nuclear material is based on $UO_2$; providing an additive; forming a green pellet, wherein said additive is added either to said nuclear fuel material or to the green pellet; and sintering the green pellet, wherein said additive causes larger grains in the nuclear fuel pellet, and wherein said additive is made of or includes a substance
(Continued)

which causes the larger grains and which substantially leaves at least an outer portion of the pellet before and/or during the sintering step, wherein said substance is made of, or comprises, B and/or Cr.

18 Claims, 3 Drawing Sheets

(51) Int. Cl.
    *G21C 3/62*     (2006.01)
    *G21C 3/18*     (2006.01)
    *G21C 3/20*     (2006.01)

(52) U.S. Cl.
    CPC ............. *G21C 3/623* (2013.01); *G21C 3/045* (2019.01); *Y02E 30/38* (2013.01)

(58) Field of Classification Search
    USPC .................................................. 376/260, 414
    See application file for complete search history.

(56) References Cited

U.S. PATENT DOCUMENTS

2010/0091933 A1* 4/2010 Song .................. G21C 21/02
                                                               376/414

2012/0098149 A1* 4/2012 Yang ...................... G21C 21/02
                                                               264/0.5
2014/0185731 A1     7/2014 Kim et al.

FOREIGN PATENT DOCUMENTS

| | | |
|---|---|---|
| GB | 2020641 A | 11/1979 |
| GB | 2107691 A | 5/1983 |
| GB | 2177249 A | 1/1987 |
| JP | S42-024629 | 11/1967 |
| JP | 9-127279 A | 5/1997 |
| JP | H09127279 A | 5/1997 |
| JP | H11-211871 A | 8/1999 |
| JP | 2002537565 A | 11/2002 |
| WO | 97/13252 A1 | 4/1997 |
| WO | 00/49621 A1 | 8/2000 |
| WO | 2005/041208 A2 | 5/2005 |

OTHER PUBLICATIONS

International Search Report for International Application No. PCT/EP2015/058940, dated Jul. 27, 2015.
Notice of Reasons for Rejection issued in corresponding Japanese Application No. 2017-510652, dated Nov. 27, 2018, pp. 1-4.

* cited by examiner

METHOD OF MAKING A NUCLEAR FUEL PELLET FOR A NUCLEAR POWER REACTOR

BACKGROUND

The present invention concerns a method of making a nuclear fuel pellet for a nuclear power reactor.

Different manners of producing nuclear fuel pellets are known by a person skilled in the art. It is normal to make the nuclear fuel pellet from a nuclear fuel material in powder form. The nuclear fuel material may for example be $UO_2$, where U is enriched with regard to $^{235}U$. The powder material may also include additives, such as $U_3O_8$ and binder material. The powder is pressed in order to form a so-called green pellet. The concept "green pellet" in this technical field means the pressed pellet before it is sintered. The green pellet is thus thereafter sintered in a furnace. The sintered pellets are thereafter ground in order to obtain the correct diameter and surface finish.

It is also known to include some additives in the powder in order to increase the grain size in the sintered pellet. For example WO 00/49621 A1 gives some examples of such additives and describes how the nuclear fuel pellet may be produced.

Other examples of how to increase the grain size in the nuclear fuel are described in GB 2177249 A, GB 2020641 A, GB 2107691 A and DE 3235944 A1.

WO 2005/041208 A2 describes that a porous uranium dioxide arrangement is infiltrated with a precursor liquid in the form of allylhydridopolycarbosilane in order to enhance the thermal conductivity in the nuclear fuel.

Another phenomenon that occurs when using nuclear fuel in a nuclear reactor is a structure in the used nuclear fuel pellets called high burn-up structure (HBS) or rim structure. When the nuclear fuel has been used for a longer time in a nuclear reactor (i.e. a high burn-up) a new restructured configuration appears at the outer thin region of the fuel pellet. This phenomenon is described for example in the article "The high burn-up structure in nuclear fuel" by V. V. Rondinella et al. in Materials Today, December 2010, Volume 13, No. 12, pages 24-32. The HBS means that the grains in the outer region of the nuclear fuel pellet subdivide into very small grains. The outer region in which the HBS appears may for example be less than 100 μm thick. Different problems caused by the HBS are mentioned in this document.

WO 97/13252 A1 and JP 9-127279 A describe different ways of reducing problems of the rim structure.

SUMMARY

When in this document a certain percentage of a material is mentioned, this concerns weight percent, if nothing else is said.

When in this document a certain grain size is mentioned, this refers to the so-called two dimensional (2D) grain size, i.e. the grain size measured in a plane, if nothing else is said.

As mentioned above, the HBS may have negative effects. For example, HBS may have a detrimental effect on thermal conductivity, fission gas release, and behavior during a loss-of-coolant event. There is therefore regulations stating that nuclear fuel may only be used up to a certain burn-up level.

An object of the present invention is to provide a method of making a nuclear fuel pellet, with which method improved nuclear fuel can be produced. A particular object is thereby to make a nuclear fuel with which the formation of the HBS is prevented or delayed. A further object is to provide such a method which can be carried out in a relatively simple manner.

The above objects are achieved by a method of making a nuclear fuel pellet for a nuclear power reactor, the method comprising the following steps:

providing a nuclear fuel material in powder form,
providing an additive,
pressing the powder such that a so-called green pellet is ob-tained,
wherein said additive is added either to said nuclear fuel mate-rial in powder form or to the green pellet,
sintering the so obtained green pellet,
wherein said additive is such that larger grains in the nuclear fuel material are present in the pellet after the sintering step as com-pared with the grain size obtained if a pellet, which is produced ac-cording to the above manner but without the addition of the additive, is sintered in the same manner,
wherein said additive is made of or includes a substance which causes said larger grains in the sintered pellet, wherein said sub-stance is selected and the method is performed such that at least to 90% of the substance, leaves at least an outer portion of the pellet before and/or during the sintering step.

The inventors of the present invention have realized that the occurrence of the above described HBS may be prevented, or delayed, if the nuclear fuel pellet has larger grains at least in the outer portion of the nuclear fuel pellet (where the HBS occurs).

Furthermore, the inventors have realized that it may be an advantage if additives do not remain in the sintered pellet, or at least not in an outer portion of the pellet. For example, the presence of additives may affect the neutron economy; i.e. the additives may absorb neutrons. On the other hand, as explained above, large grains, at least in the outer portion of the nuclear fuel pellet, are advantageous in order to prevent the HBS. It is therefore an advantage to use a substance that leaves at least an outer portion of the pellet before or during the sintering step.

The mentioned substance may also, to the same extents as mentioned in claim 1, leave the whole nuclear fuel pellet before and/or during the sintering step.

With a nuclear fuel pellet made in accordance with the present invention, the formation of HBS can thus be prevented or delayed when using the nuclear fuel pellet in a nuclear reactor. The nuclear fuel produced in accordance with the present invention can therefore be used for a longer time in the nuclear reactor, i.e. to a higher burn-up.

The substance may be included in a compound, such that the additive is a compound which includes the substance which causes the larger grains. The rest of the compound may act primarily as a carrier of the substance which causes the larger grains. For example, the additive may be $UB_4$. In this case the B will cause the larger grains, but the U as such in the compound $UB_4$ will not substantially contribute the larger grains. This is thus the reason why it is stated in the claim that the substance causes the larger grains. The sub-stance is preferably a chemical element, for example B or Cr. The additive may include more than one such substance.

The nuclear fuel material in the powder is preferably based on $UO_2$ as the actual nuclear fuel material. The nuclear fuel material in powder form may to at least 60%, preferably to at least 70%, more preferred to at least 80% or at least 90%, consist of $UO_2$. As is known to a person skilled in the art, the powder may also comprise other matters, such as binders, $U_3O_8$, burnable neutron absorbers, pore formers and sintering aid, for example $Al_2O_3$.

When it is said that larger grains are obtained with the additive (as compared with the grain size obtained if a pellet that has been produced in the same manner, but without the addition of the additive, is sintered in the same manner), this means that substantially larger grains are obtained, for example the average grain size (at least in the part of the pellet, where the additive is added) may be at least 50% larger, preferable at least 100% larger, most preferred at least 200% larger. The average grain size obtained with the help of the additive may for example be at least 20 µm, preferably at least 30 µm.

According to one manner of carrying out the method of the invention, the produced nuclear fuel pellet has a substantially cylindrical shape with a radius r, wherein said outer portion is the part of the nuclear fuel pellet that is located between 0.8 r and r, or between 0.9 r and r, or between 0.95 r and r.

According to a further manner of carrying out the method of the invention, said substance is made of, or comprises, B and/or Cr. These substances are advantageous substances that will increase the grain size.

According to a further manner of carrying out the method of the invention, said additive to at least 60%, preferably to at least 80%, most preferred to 100%, is selected from the group consisting of B, $UB_4$, $B_4C$, $ZrB_2$, Cr, CrO, $CrO_2$ and $Cr_2O_3$ or combinations thereof. These additives have been found to be particularly advantageous in order to obtain the larger grain size, without the mentioned substance remaining in at least an outer portion of the produced pellet.

According to a further manner of carrying out the method of the invention, said additive comprises B and at least 90% of said B is $^{11}B$. B in the form of the isotope $^{10}B$ acts as a neutron absorber. However, if the purpose of the added B is to increase the grain size, but not to act as a neutron absorber, then it is preferable to use the isotope $^{11}B$, since if some B would remain in the sintered pellet, this B will in this case not act as a neutron absorber. The B may, for example, be selected such that it in said additive to at least 98% is present in the form of the isotope $^{11}B$.

According to a further manner of carrying out the method of the invention, the method comprises arranging said additive such that an outer portion of the green pellet contains substantially more additive than an inner portion of the green pellet, such that the sintered pellet has a larger grain size in the outer portion than in the inner portion. If the additive is only present in an outer portion, it is easier to make the additive leave the pellet, for example during a heating step, such as the sintering step. Furthermore, as explained above, the HBS occurs at the outer portion of the nuclear fuel pellet. It is therefore sufficient to have larger grains in the outer portion of the nuclear fuel pellet in order to prevent or delay the formation of the HBS.

The outer and inner portions may be defined in different manners. For example, if we consider a cylindrical nuclear fuel pellet with a radius r, the inner portion may for example be the part of the nuclear fuel pellet from the centre of the pellet outwards up to for example 0.6 r and the outer portion may for example be the part of the nuclear fuel pellet that is located between 0.8 r and r or between 0.9 r and r, or between 0.95 r and r (depending on where it is desired that the grains are larger). When it is stated that the grain size is larger in the outer portion, also this may be defined in different manners. For example, if we consider the average 2D grain size in the outer portion and the average 2D grain size in the inner portion, the average grain size in the outer portion may be at least 50%, preferably at least 100%, larger than the average grain size in the inner portion.

According to a further manner of carrying out the method of the invention, said additive is provided in the form of particles. Such particles may be mixed with the nuclear fuel material in powder form before pressing this powder into the green pellet. Alternatively, the particles may be added to the green pellet.

According to a further manner of carrying out the method of the invention, the method comprises providing a liquid and arranging the additive in the liquid such that said additive is in the form of particles dispersed in said liquid, wherein the liquid with the additive is added either to said nuclear fuel material in powder form or to the green pellet. It is advantageous to use a liquid as a carrier of such particles. Since the particles are dispersed in the liquid, the particles do not dissolve in the liquid.

According to a further manner of carrying out the method of the invention, the method comprises adding said liquid with the additive to the green pellet by contacting the green pellet with the liquid such that the liquid, with the additive, penetrates into the green pellet and controlling the penetration depth of the liquid, and thereby of the additive, into the green pellet. According to this alternative, the additive which increases the grain size is thus added after the green pellet has been formed. It is therefore not necessary to add the additive to the powder before pressing the green pellet. Since the additive is provided in a liquid, it can be controlled to which extent the additive enters into the green pellet. An improved control of the addition of the additive which increases the grain size is therefore achieved. Furthermore, it is quite easy to apply the liquid, with additive, to the green pellet. By controlling the penetration depth, it is possible to control in which region in the pellet the liquid, with the additive, is present. It is thereby possible to control where the additive is present in the pellet.

According to a further manner of carrying out the method of the invention, said step of controlling the penetration depth is done by selecting one or both of the following:
the viscosity of the liquid with included additive,
the amount of the liquid, with the additive, which is added to the green pellet when contacting the green pellet with the liquid, with the additive.

By selecting a liquid with a certain viscosity it is possible to control the penetration depth of the liquid. The penetration depth may also be controlled by controlling how much liquid is added to the green pellet.

The amount of the liquid, with the additive, which is added to the green pellet can be controlled for example by spraying a certain amount of the liquid, with additive, onto the green pellet, or by exposing the green pellet to the liquid, with additive (for example by dipping the green pellet in the liquid, with additive) during a predetermined time.

The penetration depth of the liquid, with the additive, into the green pellet can be controlled such that an outer portion of the green pellet contains substantially more liquid, and thereby more additive, than an inner portion of the green pellet, such that the sintered pellet has a larger grain size in the outer portion than in the inner portion.

Said liquid with additive can be selected and said method can be performed such that the liquid with additive will penetrate into the pores which exist between the grains in the green pellet.

The green pellet will have pores both between the grains in the green pellet and inside the grains in the green pellet. The pores inside the grains are normally smaller than the pores which exist between the grains. Consequently, it can be controlled (for example by selecting a certain viscosity) that the liquid will penetrate into the pores which exist between the grains.

Said liquid with additive can be selected and said method can be performed such that the liquid with additive will not, at least not to any substantial degree, penetrate into the pores which exist in the grains in the green pellet. According to this alternative, the additive will not to any substantial degree enter into the grains, but the additive will be added into the pores which exist between the grains.

Alternatively, said liquid with additive can be selected and said method can be performed such that the liquid with additive will penetrate also into the pores which exist in the grains in the green pellet. According to this alternative, the additive will thus enter also into the pores in the grains. With the present invention it is thus possible to control where in the green pellet the additive is added.

According to a further manner of carrying out the method of the invention, said liquid is selected and said method is performed such that the liquid will completely, or at least to 99%, leave the pellet before or during the sintering step. Since the liquid will leave the pellet, the liquid (and the material which constitutes the liquid) will not be present in the sintered pellet. Consequently, the liquid acts as a carrier of the additive and will not influence the properties of the produced pellet.

Preferably, the liquid leaves the pellet during a step of heating the pellet. This can either be a separate heating step before the sintering step or the heating that is performed during the sintering step. The latter alternative has the advantage that no separate heating step is necessary.

Said liquid can be selected such that the additive does not dissolve in the liquid, and such that the nuclear fuel material in the green pellet is not dissolved by the liquid.

According to a further manner of carrying out the method of the invention, said liquid is an oil, preferably a mineral oil. Such liquids have advantageous properties for acting as a carrier for the additive. Furthermore, by selecting a suitable mineral oil, a suitable viscosity is achieved.

The invention also concerns a method of making and using nuclear fuel. This method comprises:

making a plurality of nuclear fuel pellets according to any one of the preceding manners, arranging the nuclear fuel pellets in cladding tubes, arranging the cladding tubes, with the nuclear fuel pellets, in the core of a nuclear power reactor in a nuclear power plant, such that at least 20%, preferably at least 50%, most preferred 100%, of the nuclear fuel material in said core are made of pellets made in accordance with any one of the preceding manners, operating the nuclear reactor to produce energy.

By using the advantageous nuclear fuel pellets obtained with the method according to the present invention in a real nuclear power reactor, the advantages of the produced nuclear fuel are thus achieved in a nuclear power reactor plant for producing energy. The nuclear power reactor preferably comprises several thousand cladding tubes comprising nuclear fuel pellets produced with the method according to the present invention. By using the nuclear fuel pellets produced in accordance with the present invention in a nuclear reactor, the nuclear fuel may be used for a longer time, since the formation of HBS is prevented or delayed with the present invention.

DETAILED DESCRIPTION

Since a person skilled in the art knows how to produce nuclear fuel pellets from a powder, all the details of such a method will not be described herein. However, the main steps which are relevant to the present invention are described.

Figure 1:
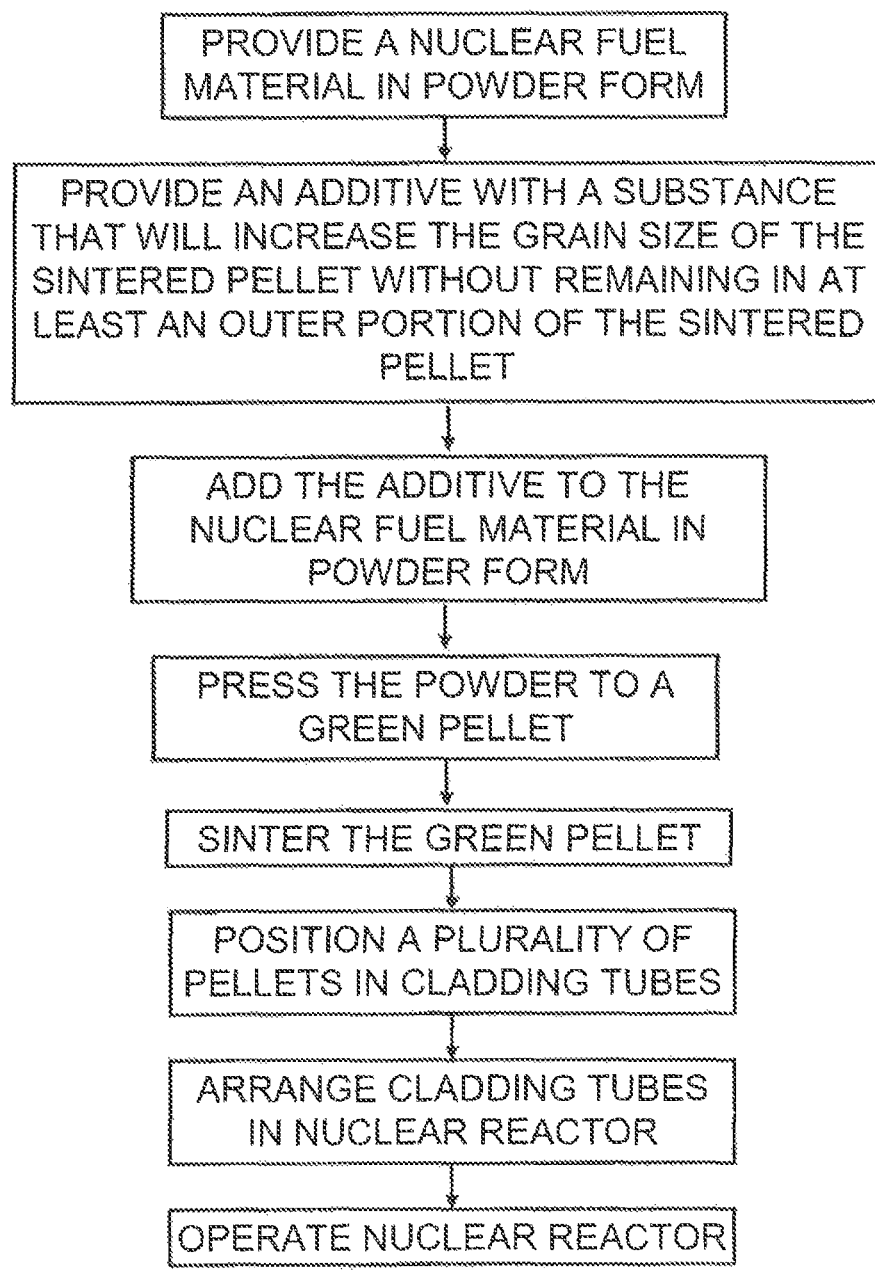
FIG. 1 shows schematically a flow chart of a manner of carrying out a method according to the invention.

FIG. 1 shows schematically the main steps of a manner of carrying out a method according to the present invention.

A nuclear fuel material in powder form is provided. The nuclear fuel material may be based on $UO_2$, which is enriched concerning $^{235}U$. The powder may also comprise other materials, for example binder materials and $U_3O_8$.

An additive is provided. The additive constitutes or includes a substance that will increase the grain size of the sintered pellet. Furthermore, the substance is such that it will leave at least an outer portion of the pellet before and/or during a sintering step.

The additive may for example comprise B, for example in the form of $UB_4$. According to one embodiment, the B is in the form of $^{11}B$. B has the property of increasing the grain size when the green pellet is sintered. However, B will also to a large extent leave the pellet when it is heated during the sintering process, or before the sintering if a heating step is performed before the actual sintering.

According to another alternative, the additive may be for example $Cr_2O_3$. Also Cr has the property of increasing the grain size. Furthermore, also Cr will to a substantial degree leave at least an outer portion of the pellet if sufficient temperature and time are used for heating the pellet, before or during the sintering step.

The additive is preferably in the form of particles, i.e. a powder.

The additive powder is mixed with the nuclear fuel material in powder form.

The mixed powder is pressed such that a green pellet is formed.

The additive may be mixed with the whole nuclear fuel material in powder form. Alternatively, it is possible to mix the additive with only a part of the nuclear fuel material in powder form. According to the first mentioned alternative, the additive may thus be distributed in the whole green pellet. According to the second alternative, it is possible to arrange the nuclear fuel material in powder form without the additive in an inner portion and to add the mixture of the additive and the nuclear fuel material in powder form to an outer portion before the green pellet is pressed. According to the second alternative, the additive will thus be present only in an outer portion of the green pellet.

The green pellet is then sintered. This can be done for example in a furnace which contains different zones where the pellet is heated up to a final temperature of about 1 800° C. The temperature and the time is selected such that the substance in the additive which causes the larger grains in the sintered pellet will substantially leave (evaporate) at least an outer portion of the pellet during the sintering step. Alternatively, a separate heating step may be performed before the actual sintering in order to achieve this.

The sintered pellet is ground in order to obtain the correct diameter and surface finish.

The nuclear fuel pellet has a substantially cylindrical shape with a radius r. The outer portion of the pellet may for example be the part of the produced nuclear fuel pellet that is located between 0.9 r and r.

When a plurality of nuclear fuel pellets have been made in accordance with the present invention, the nuclear fuel pellets are arranged in cladding tubes. The cladding tubes are then positioned in nuclear fuel assemblies which are arranged in a nuclear reactor. The nuclear reactor is then operated in order to produce energy.

Figure 2:
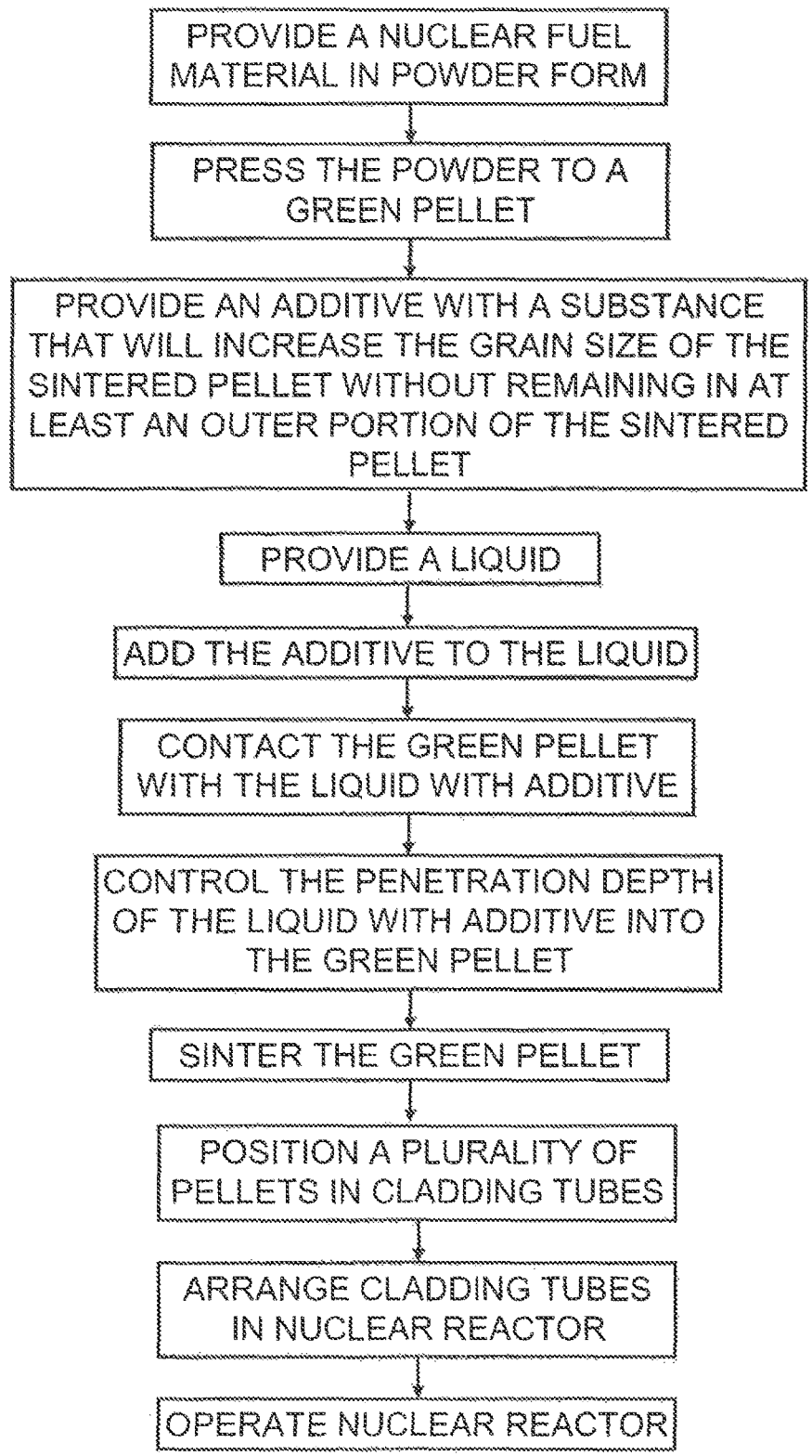
FIG. 2 shows schematically a flow chart of another manner of carrying out a method according to the invention.

FIG. 2 shows a flow chart of another manner of carrying out a method according to the invention. The main difference in the method according to FIG. 2, as compared with the method according to FIG. 1, is that the additive is added after the green pellet has been formed.

According to FIG. 2, a nuclear fuel material in powder form is provided. The same nuclear fuel material as mentioned in connection with FIG. 1 may be used.

The powder is pressed such that a "green" pellet is formed. The green pellet will be porous. For example 50% of the pressed pellet may consist of pores.

An additive is made of or includes a substance which will increase the grain size of the sintered pellet. Furthermore, the substance, which causes the larger grains, is such that it will leave at least an outer portion of the pellet before and/or during a following sintering step. The additive may for example comprise B, for example in the form of $UB_4$. According to one embodiment, the B is in the form of $^{11}B$.

According to another example, the additive may be $Cr_2O_3$.

The additive is preferably in the form of particles, i.e. a powder. The size of the particles should be small enough so that the particles can penetrate into the pores in the green pellet, into which it is intended that the particles should penetrate. The particle size may for example be about 1 μm.

A liquid is provided. The liquid may be a mineral oil. The mineral oil may be selected to have a desired viscosity, for example a kinematic viscosity of 320 centistokes.

The additive is mixed with the liquid. Preferably, the additive particles are dispersed in the liquid, i.e. the liquid is selected such that the additive particles do not dissolve in the liquid, and also such that the nuclear fuel material in the green pellet is not dissolved by the liquid.

The green pellet is brought into contact with the liquid with the additive. The green pellet may for example be dipped into the liquid with additive or the liquid with additive may be sprayed onto the green pellet.

The penetration depth of the liquid, and thereby of the additive, into the green pellet is controlled. This can be done by selecting a suitable viscosity of the liquid or by controlling the amount of liquid, with the additive, which is added to the green pellet. This can be done for example by spraying a certain amount of the liquid onto the pellet or by dipping the green pellet in the liquid, with additive, during a predetermined time.

The penetration depth can be controlled such that the additive is added only to an outer portion of the green pellet.

By controlling for example the viscosity of the liquid, with the additive, or the size of the additive particles, it is also possible to control into which pores in the green pellet that the additive will enter. For example, it may be controlled that the additive will substantially only enter into the pores which exist between the grains in the green pellet. Alternatively, it may be controlled that the additive will enter also into the pores which exist in the grains in the green pellet.

The so treated green pellet is then sintered. This can be done for example by a sintering process in a furnace which contains different zones where the pellet is heated up to a final temperature of about 1 800° C.

The liquid is preferably selected such that it will evaporate during the heating process. There may be a separate heating step before the actual sintering in order to evaporate the liquid. However, no such separate heating step may be necessary, since the liquid will evaporate during the sintering process.

The time and temperature for the heating/sintering process are selected such that also (at least) the substance which causes the larger grains will substantially leave at least an outer portion of the pellet before and/or during the sintering step. The outer portion of the pellet may, as explained above, for example be the part of the produced nuclear fuel pellet that is located between 0.9 r and r.

When it is desired to increase the grain size in the whole nuclear fuel pellet, the additive, and the viscosity of the liquid, may be selected such that the whole pellet is infiltrated with the liquid with the additive. However, as explained above, it is possible to control the penetration depth of the liquid with the additive. According to a preferred manner of carrying out the present invention, the penetration depth is controlled such that the additive will substantially enter only into an outer peripheral portion of the green pellet. When the green pellet is then sintered, larger grains will be obtained mainly in an outer portion of the pellet.

Figure 3:
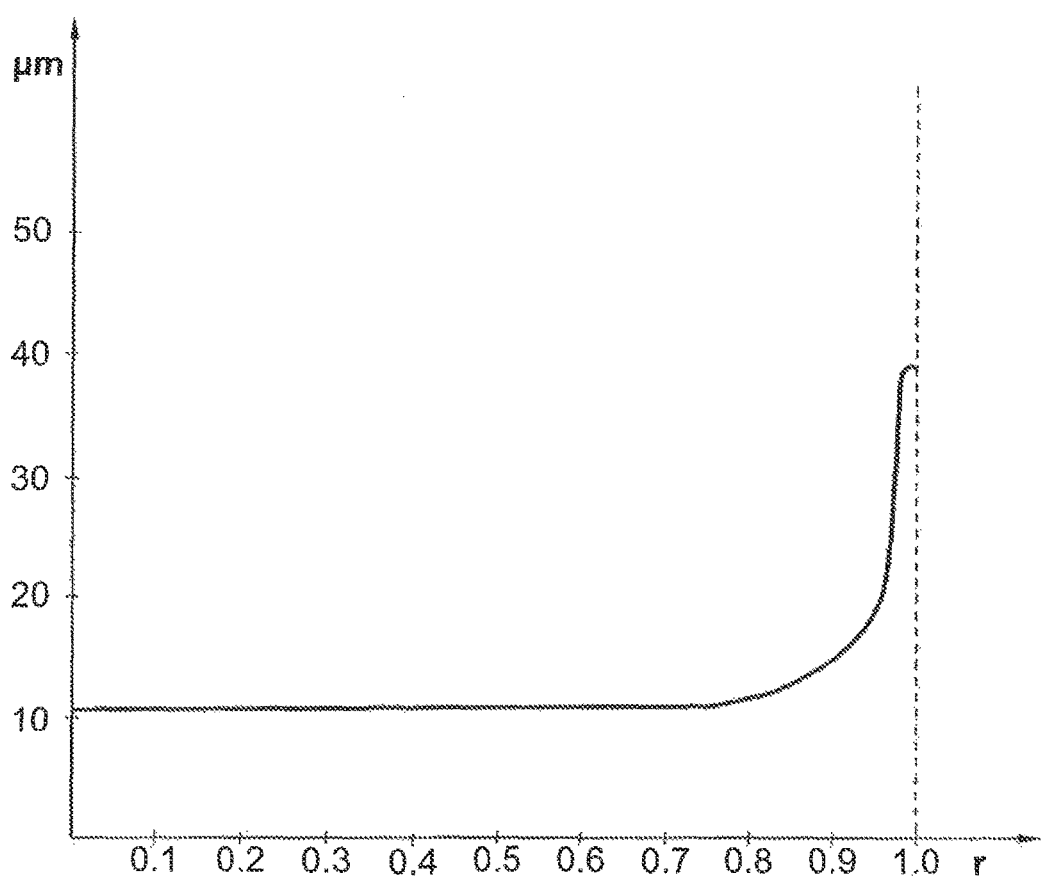
FIG. 3 shows schematically an example of how the grain size in a pellet produced in accordance one manner of carrying out a method according to the invention may vary in the radial direction of the pellet.

FIG. 3 illustrates schematically how the grain size may vary in a pellet produced in this manner or in the manner described in connection with FIG. 1 (if the additive is added in an outer portion of the pellet). The x-axis shows the radius of the sintered pellet. The radius r 1.0 is thus the outer periphery of the pellet. The radius of the pellet may for example be about 4.6 mm. The y-axis in FIG. 3 shows the average 2D grain size. The curve in FIG. 3 thus shows how the average 2D grain size varies with the radius. FIG. 3 thus illustrates that according to this embodiment of the invention, a substantially larger grain size is obtained in the outer portion of the sintered pellet. This has in particular the advantage that the formation of the above described HBS can be prevented or delayed.

In the same manner as described in connection with FIG. 1, a plurality of nuclear fuel pellets are produced according to the method of the present invention.

The produced pellets are arranged in cladding tubes.

The cladding tubes are arranged in the core of a nuclear power reactor, such that the core includes several thousand cladding tubes with pellets produced in accordance with the present invention.

The nuclear reactor is operated in order to produce energy.

The present invention is not limited to the examples described herein, but can be varied and modified within the scope of the following claims.

What is claimed is:

1. A method of making a nuclear fuel pellet for a nuclear power reactor, the method comprising the following steps:
   providing a nuclear fuel material in powder form, the nuclear material is based on $UO_2$,
   providing an additive,
   pressing the powder thereby obtaining a green pellet, wherein said additive is added either to said nuclear fuel material or to the green pellet,
   arranging said additive so an outer portion of the green pellet contains substantially more additive than an inner portion of the green pellet, and sintering the so obtained green pellet, wherein the sintered pellet has a larger grain size in the outer portion than in the inner portion, wherein with said additive larger grains in the nuclear fuel material are present in the pellet after the sintering step as compared with the grain size obtained if the additive had not been added, but otherwise produced in the same manner, wherein said additive is made of or includes a substance which causes said larger grains in the sintered pellet, wherein said substance is made of, or comprises, B and/or Cr, and further wherein said substance is selected and the method is performed wherein at least 90% of the substance leaves at least an outer portion of the pellet before and/or during the sintering step.

2. A method according to claim 1, wherein the produced nuclear fuel pellet has a substantially cylindrical shape with a radius r and wherein said outer portion is the part of the nuclear fuel pellet that is located between 0.8 r and r, or between 0.9 r and r, or between 0.95 r and r.

3. A method according to claim 1, wherein at least 60% of the additive is selected from the group consisting of B, $UB_4$, $B_4C$, $ZrB_2$, Cr, CrO, $CrO_2$ and $Cr_2O_3$ or combinations thereof.

4. A method according to claim 1, wherein said additive comprises B and wherein at least 90% of said B is $^{11}B$.

5. A method according to claim 1, wherein said additive is provided in the form of particles.

6. A method according to claim 5, comprising providing a liquid and arranging the additive in the liquid wherein said additive is in the form of particles dispersed in said liquid, wherein the liquid with the additive is added either to said nuclear fuel material or to the green pellet.

7. A method according to claim 6, comprising adding said liquid with the additive to the green pellet by contacting the green pellet with the liquid so the liquid, with the additive, penetrates into the green pellet and controlling the penetration depth of the liquid, and thereby of the additive, into the green pellet.

8. A method according to claim 7, wherein said step of controlling the penetration depth is done by selecting one or both of the following:

the viscosity of the liquid with included additive, the amount of the liquid, with the additive, which is added to the green pellet when contacting the green pellet with the liquid, with the additive.

9. A method according to claim 6, wherein said liquid is selected and said method is performed so at least 99% of the liquid will leave the pellet before or during the sintering step.

10. A method according to claim 6, wherein said liquid is an oil.

11. A method according to claim 10, wherein said oil is a mineral oil.

12. A method according to claim 1, wherein at least 95% of the substance leaves at least an outer portion of the pellet before and/or during the sintering step.

13. A method according to claim 12, wherein at least 99% of the substance leaves at least the outer portion of the pellet before and/or during the sintering step.

14. A method according to claim 3, wherein at least 80% of the additive is selected from the group consisting of B, $UB_4$, $B_4C$, $ZrB_2$, Cr, CrO, $CrO_2$ and $Cr_2O_3$ or combinations thereof.

15. A method according to claim 14, wherein 100% of said additive is selected from the group consisting of B, $UB_4$, $B_4C$, $ZrB_2$, Cr, CrO, $CrO_2$ and $Cr_2O_3$ or combinations thereof.

16. A method of making and using nuclear fuel, comprising:

making a plurality of nuclear fuel pellets as defined in the method of claim 1;

arranging the nuclear fuel pellets in cladding tubes;

arranging the cladding tubes, with the nuclear fuel pellets, in the core of a nuclear power reactor in a nuclear power plant, wherein at least 20% of the nuclear fuel material in said core are made of pellets in accordance with the aforementioned method of making the plurality of nuclear fuel pellets; and operating the nuclear reactor to produce energy.

17. A method according to claim 16, wherein at least 50% of the nuclear fuel material in said core are made of pellets made in accordance with the aforementioned method of making the plurality of nuclear fuel pellets.

18. A method according to claim 16, wherein 100% of the nuclear fuel material in said core are made of pellets made in accordance with the aforementioned method of making the plurality of nuclear fuel pellets.

* * * * *